Oct. 26, 1965 W. MATTHIES ETAL 3,214,007
CONVEYOR CONSTRUCTION
Filed March 9, 1961 4 Sheets-Sheet 1
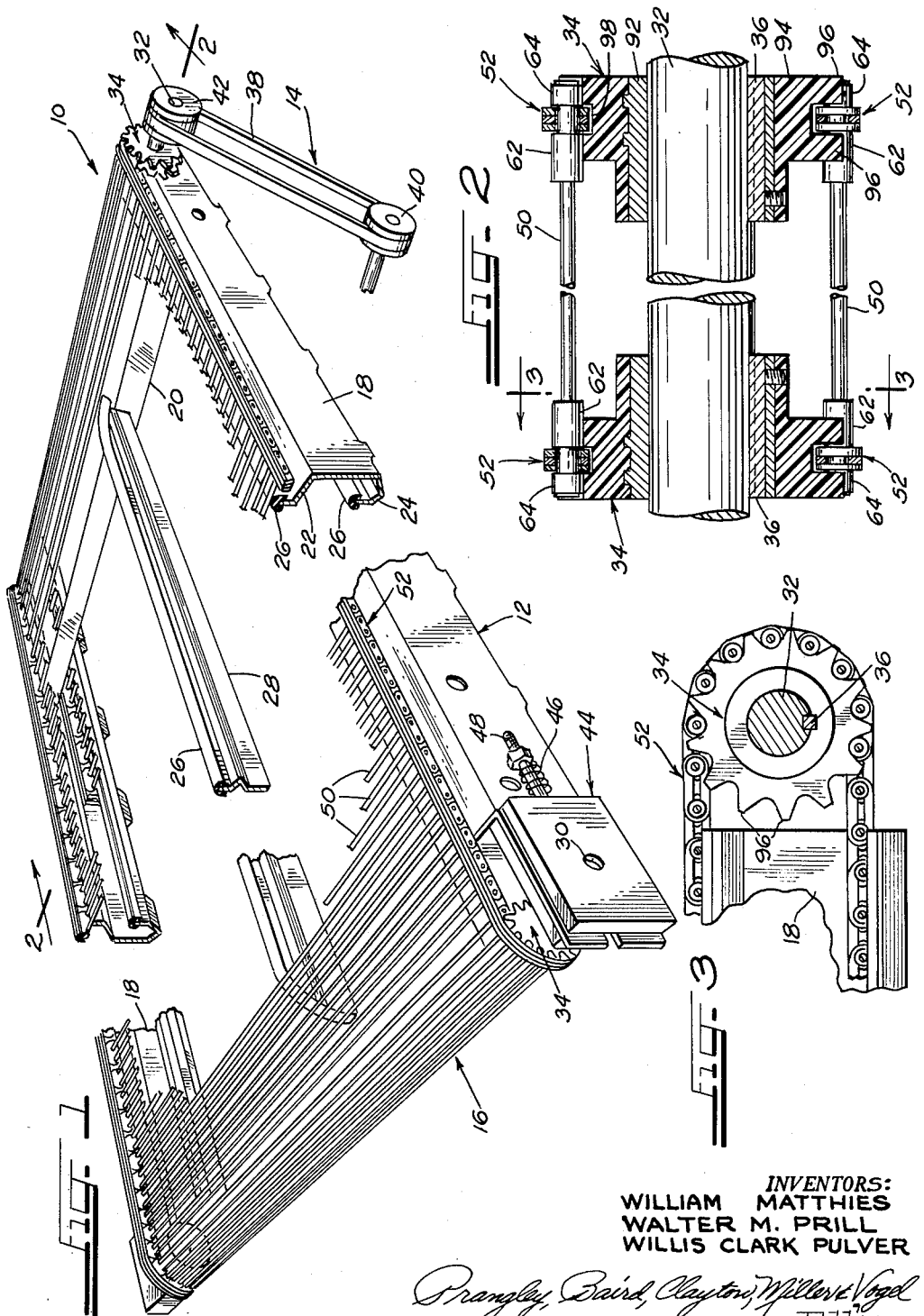
INVENTORS:
WILLIAM MATTHIES
WALTER M. PRILL
WILLIS CLARK PULVER Oct. 26, 1965 W. MATTHIES ETAL 3,214,007
CONVEYOR CONSTRUCTION
Filed March 9, 1961 4 Sheets-Sheet 2
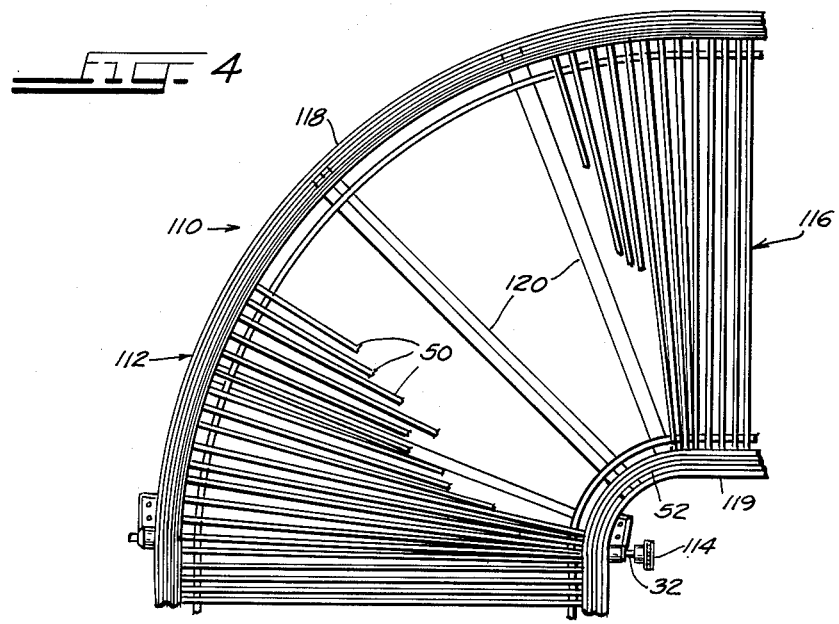
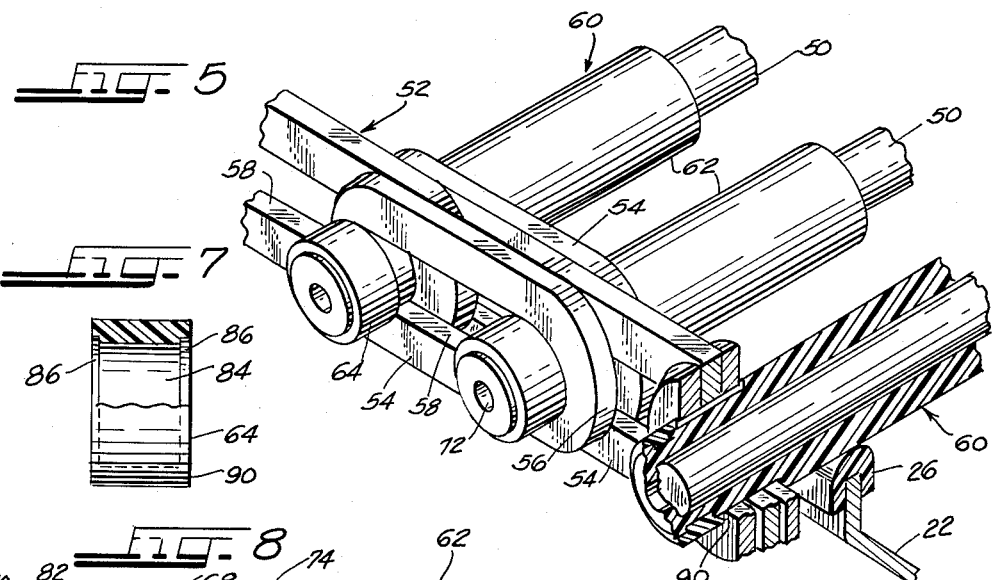
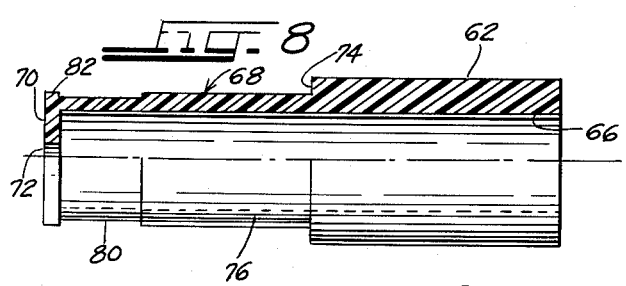
INVENTORS:
WILLIAM MATTHIES
WALTER M. PRILL
WILLIS CLARK PULVER

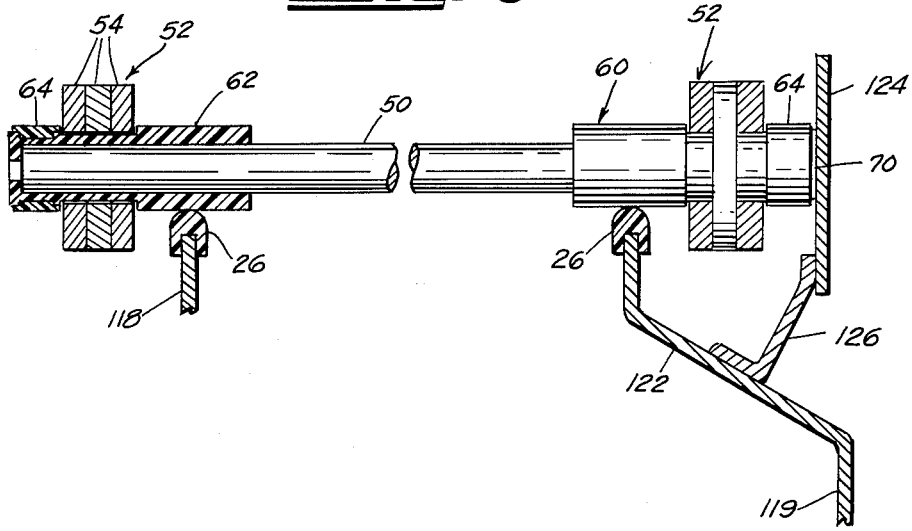
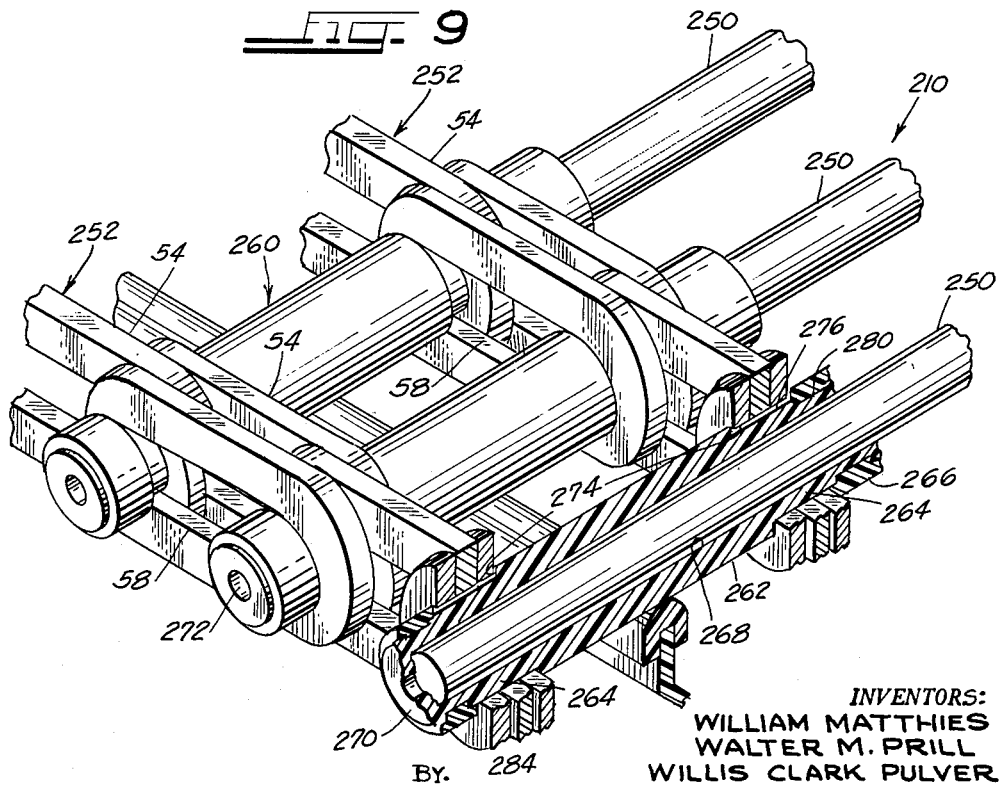

Oct. 26, 1965  W. MATTHIES ETAL  3,214,007
CONVEYOR CONSTRUCTION
Filed March 9, 1961  4 Sheets-Sheet 4
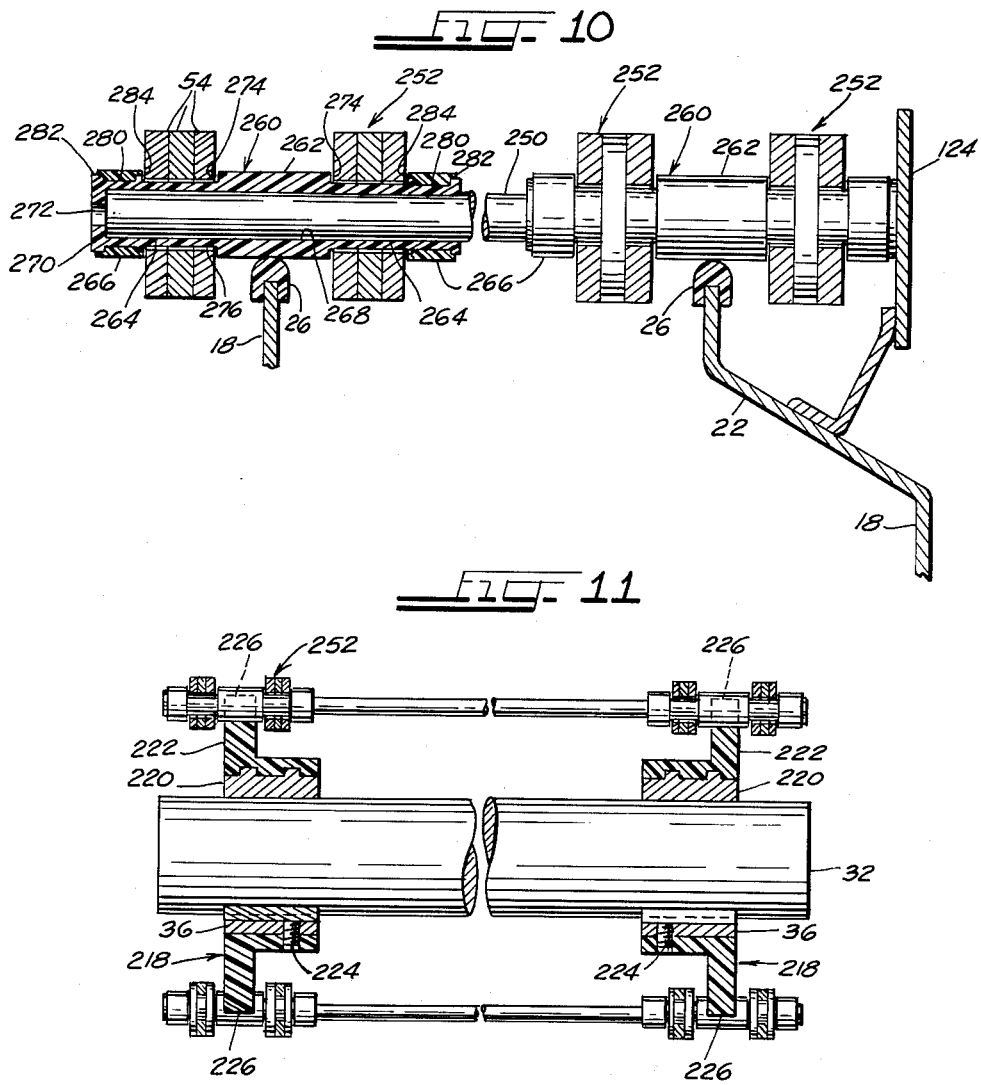
INVENTORS:
WILLIAM MATTHIES
WALTER M. PRILL
WILLIS CLARK PULVER United States Patent Office 3,214,007
Patented Oct. 26, 1965

3,214,007
CONVEYOR CONSTRUCTION
William Matthies and Walter M. Prill, Skokie, and Willis Clark Pulver, Oak Lawn, Ill., assignors to Velten & Pulver, Inc., Chicago Ridge, Ill., a corporation of Illinois
Filed Mar. 9, 1961, Ser. No. 94,581
6 Claims. (Cl. 198—195)

This invention relates to conveyor apparatus, and, more specifically, to a new driving and supporting arrangement for conveyors having an endless conveying apron comprised of a plurality of spaced apart rods or bars.

A conveyor apparatus of the type herein considered includes a conveyor apron comprising a plurality of individual rods respectively interconnected at the opposite ends thereof by the links of endless chains. The rods themselves or parts associated therewith are engaged by motor driven means operatively associated therewith and are thereby advanced along a predetermined conveying path.

In the operation of this type of conveyor the apron rods are generally subjected to two types of loadings; first, the dead weights of the articles being conveyed, and, second, the driving forces which are desirably applied at the opposite end portions of the rods. The first type of loading is usually structurally satisfied by rods of quite moderate diameters inasmuch as several rods always support the article being conveyed. The second loading, a dynamic loading, however tends to induce bending and wearing at the end portions of the individual rods. This would ordinarily suggest that a larger rod diameter should be used to satisfy the second type loading than would be required for the first.

To avoid increasing the diameter of the apron rods to satisfy the latter type loading, however, the use of an arrangement of resilient, non-metallic, collar-like portions has been devised and presented in a copending application of Willis Clark Pulver filed on the same date as the instant application, the Willis Clark Pulver application being a continuation-in-part of his earlier application, Serial No. 7,443, filed February 8, 1960 and now abandoned. The present invention is an improved form of such apparatus.

It is an important object of the present invention to provide a conveyor of the type described having an improved conveyor apron structure wherein the individual parts thereof may be assembled more quickly either in the field or in the shop than was possible heretofore.

Another object of the invention is to provide a conveyor aparatus having an endless conveyor apron of the multiple rod type which is movable in a predetermined conveying path having either straight or curved segments.

Still another object is to provide a conveyor having an endless conveyor apron comprising a multiplicity of rods which are themselves driven by sprockets and having interconnecting endless chains serving to link adjacent ones of said rods and incorporating improved srtucture for securing a plurality of endless chains in a spaced apart relationship adjacent the opposite end portions of the apron rods.

Yet another object is to provide a conveyor of the type described having improved structure for mounting endless chains in spaced apart pairs on the opposite end portions of the apron rods.

Still another object is to provide in a conveyor of the type described an improved apron arrangement wherein there is no metal-to-metal engagement in either the apron drive or support mechanism.

A further object of the invention is to provide for vertically supporting the conveyor apron at reinforced portions in alignment with the apron drive mechanism.

Further features of the invention pertain to the particular arrangement of the elements thereof whereby the above-outlined and additional operative features are attained.

The invention both as to its organization and method of operation together with further objects and advantages thereof, will best be understood by reference to the following specification taken in connection with the accompanying drawings wherein like reference numerals have been used to designate like parts throughout, in which;

FIGURE 1 is a perspective view, partially broken away, of a conveyor apparatus made in accordance with and embodying the principles of the present invention;

FIG. 2 is a greatly enlarged, vertical sectional view, partially broken away, taken in the direction of the arrows along the line 2—2 of FIG. 1;

FIG. 3 is a reduced vertical sectional view, partially broken away, taken in the direction of the arrows along the line 3—3 of FIG. 2;

FIG. 4 is a top plan view, partially broken away, of a modified form of the conveyor apparatus of the present invention;

FIG. 5 is a greatly enlarged, fragmentary perspective view, illustrating a first form of sleeve and chain structure incorporated in the conveyor apparatus of the present invention;

FIG. 6 is an enlarged, transverse cross sectional view illustrating the conveyor apron support details such as may be employed in the form of the invention illustrated in FIG. 4;

FIG. 7 is a greatly enlarged, transverse cross sectional view of a collar element for the sleeve structures of the present invention;

FIG. 8 is a greatly enlarged, transverse cross sectional view of the first form of sleeve structure illustrated in FIG. 5;

FIG. 9 is a greatly enlarged, fragmentary perspective view of a second form of the sleeve and chain structure incorporated in the conveyor apparatus of the present invention;

FIG. 10 is an enlarged, transverse cross sectional view, similar to FIG. 6, of the structure shown in FIG. 9, illustrating in greater detail the conveyor apron support details such as may be used in the form of the invention illustrated in FIG. 4; and FIG. 11 is a greatly enlarged, vertical sectional view, partially broken away and similar to FIG. 2, but illustrating the drive mechanism for the second form of sleeve and chain structure shown in FIG. 9.

There is shown in FIG. 1 of the drawings a conveyor generally designated by the numeral 10 including a frame 12, a conveyor apron 16, and a drive mechanism 14, all made in accordance with and incorporating the principles of the present invention. The frame 12 includes a pair of longitudinally extending, transversely spaced apart side members 18 which are rigidly connected to each other by the cross bars 20, preferably in the form of angle irons suitably bolted or otherwise secured to the side members 18.

Each of the side members 18 is provided with an inwardly and upwardly turned top 22 and bottom 24 edge portions covered by the bearing members 26. Preferably being made of a low friction material such as nylon, the bearing members 26 extend along the length of the frame 12 and slidably support the conveyor apron 16. Where the conveyor apparatus 10 is of a substantial width, one or more intermediate supports 28 for the conveyor apron 16 may be provided, and preferably each such support 28 will be equipped with a bearing member 26. Such intermediate supports 28 may be supported on the cross bars 20, shown in FIG. 1.

The drive mechanism 14 includes a pair of shafts 30, 32 extending transversely of the frame 12 and rotatably supported thereon by the side members 18. The ends of the shafts 30 and 32 extend outwardly a short distance beyond the side members 18 and are each equipped at each end thereof with a sprocket wheel 34 employed in moving the conveyor apron 16 along a predetermined path, as hereinafter described. In the specific structure illustrated, the shaft 30 and the sprocket wheels 34 carried thereby constitute an idler composition, and the shaft 32 and the sprocket wheels 34 carried thereby constittue a driving composition. More particularly, the sprocket wheels 34 mounted on the drive shaft 32 are respectively suitably secured thereto by an elongated key 36 of square cross section which engages cooperating keyways formed in the shaft 32 and the sprockets 34. The drive shaft 32 and the sprocket wheels 34 associated therewith may be rotatably driven by any suitable means, as for example, a pulley belt 38 and the associated pulley wheels 40 and 42, the first of which may be connected to a motor (not shown).

Preferably, the idler shaft 30 is supported at each of its ends for longitudinal adjustment relative to the side members 18 so as to afford selective control over the tension of the conveyor apron 16. Exemplary adjusting mechanism is designated by the numeral 44 in FIG. 1, and includes a bearing block movable longitudinally with respect to the side members 18 and a spring 46 biased away from the drive shaft 32 to maintain a resilient tension in the apron 16. It will be appreciated that a screw adjustment 48 may be included to afford a selective change in the biasing force produced by the spring 46.

The conveyor apron 16 comprises a plurality of longitudinally extending rods 50 of cylindrical across section, each rod having a substantially uniform diameter throughout its entire length. The rods 50 are arranged in a spaced apart relationship disposed transversely of the frame 12. Referring to FIG. 5, each of the rods 50 at its opposite ends is interconnected to the rod 50 next adjacent thereto by an endless chain 52 which is comprised of a plurality of interconnecting links 54. The links 54 are arranged in alternate interconnecting groups, the first group consisting of a pair of links 54 arranged in a side by side, parallel relationship, and the second group consisting of one such link 54 interposed between the parallel side-by-side links 54 of the first group.

It will be appreciated that all the links 54 may be substantially identical in size and shape, but that each single link may have substantially twice the thickness of the double links, if desired, so that the chains will be of uniform strength throughout their lengths. More specifically, each link 54 is a flat, generally rectangularly shaped member having rounded end portions 56. An elongated slot 58 is centrally disposed in each link 54, the slot 58 also having rounded end portions. It is to be understood that the width of the slot 58 is substantially greater than the diameter of the rods 50, and that the links 54 at no place come into direct contact with any one of the rods 50, as will be more fully explained hereinafter.

To maintain the interconnecting links 54 in their proper relationship in the conveyor apron 16, sleeves 60 are provided, as shown best in FIG. 5, on the opposite ends of each rod 50. More specifically, each of the sleeves 60 includes a body portion 62 having an integral longitudinally extending end element 68 of reduced outside diameter, with a discrete collar 64 mounted thereon. The body portion 62 is an elongated tubular member having a uniform axial bore 66 therein (FIG. 8), the bore 66 being closed at one end by an end wall 70, shown best in FIG. 8. A centrally exposed aperture 72 is arranged in the end wall 70 communicating with the bore 66 thereby permitting the expulsion of air from the bore 66 as the sleeve 60 is pressed onto and over the end of a rod 50. It is to be recognized that the bore 66 is of a diameter complementary to that of the rod 50 so as to effect a press fit therebetween, thereby insuring that the sleeve 60 will be securely mounted upon the rod 50.

The end element 68 of each sleeve is integrally joined to the body portion 62 at a first annular shoulder 74, the end element 68 being of a smaller diameter than the body 62. Immediately adjacent to the first shoulder 74 is a cylindrical bearing surface 76 on the end element 68. The bearing surface 76 has a width somewhat greater than that of the links 54 in the interconnecting groups so as to engage and support the links mounted on the sleeve 60. The diameter of the element 68 is selected so that the element 68 will cooperate with the slots 58 in the links 54 and the bearing surface 76 will support the links.

A peripheral recess 80 is provided on the element 68 intermediate the bearing surface 76 and the end wall 70, a ring link outer portion 82 of the end wall 70 extending slightly above the recess 80.

Referring to FIG. 7, each collar 64 is cylindrical in shape and has an axial bore 84 therein of a diameter complementary to that of the recessed portion 80 on the end element 68 of each sleeve so as to effect a tight fit therebetween when mounted thereon. The planar end faces of each collar 64 are provided with annular recesses 86 opening into the ends of the bore 84. When a collar 64 is assembled on the end element 68 of a sleeve, one recess 86 receives the outer, ring-like portion 82 of the end wall 70 and the other recess 86 receives the outer end portion of the bearing surface 76. It is to be appreciated that by this arrangement the collar 64 is prevented from sliding longitudinally with respect to the end element 68 when mounted thereon. It will also be appreciated that the outer end of each collar 64 may be made flush with the outer surface of the wall 70 when the collar is assembled upon a sleeve, if desired.

In the preferred embodiment the sleeves and collars are of molded nylon, a resilient non-metallic material, and the collars 64 may be softened as by steam treatment for the positioning thereof on the recessed sections 80. When each collar 64 has returned to ambient temperature and to its normal resilient condition, it will be fixedly secured to the end element 68, whereby a second annular shoulder 90 is provided by the inner face of each collar 64 to prevent outward movement of the endless chain 52 with respect to the sleeves and the rods 50. Preferably, the distance between the first shoulder 74 and the second shoulder 90 will be such that some clearance will be afforded between the shoulders and the sides of the links 54 so as to minimize friction in the system and avoid binding during movement of the conveyor apron 16.

As best seen in FIG. 5, the non-metallic body portions 62 of the sleeves 60 on the rods 50 engage and ride upon the non-metallic bearing members 26 of the side members 18 thereby preventing any metal-to-metal sliding contact between the conveyor apron 16 and the frame 12, while at the same time providing support for the apron. Inasmuch as both the bearing member 26 and the sleeves 60 may be made of nylon or other suitable resilient plastic materials, the frictional forces induced therebetween will be of a minimum quantity.

The arrangement for driving the conveyor apron 16 by applying the driving force at the sleeve structures 60 on the rods 50 will now be described in detail. Referring to FIG. 2, each sprocket wheel 34 includes a metal hub 92 upon which is mounted or formed a tooth equipped portion 94 formed from a material having a low coefficient of friction, such as nylon. The tooth portion 94 may be secured to the hub 92 in any appropriate manner such as by splines. Arranged in axially spaced apart pairs, the teeth 96 on each sprocket define a peripheral recess 98 therebetween, the recess 98 having an axial width greater than that of the endless chains 52. The pairs of teeth 96 are oriented so that they align with and are adapted to receive the sleeve structures 60 fixedly secured to the ends of the the rods 50. The outwardly disposed tooth 96 of each sprocket engages the collars 64, while the inwardly disposed tooth 96 engages the body portions 62 of each sleeve, whereby the conveyor apron 16 is moved along its predetermined path by the sprockets 34 associated with drive shaft 32. In this arrangement the endless chains 52 interconnecting the sleeves 60 on the adjacent rods 50 move through the annular recesses 98 of the sprocket wheels 34 without friction therebetween. It is to be appreciated that no driving force is supplied by the sprocket wheel 34 directly to the endless chains 52, the entire driving force being applied by the sprockets 34 to the sleeve structures 60, which include the collars 64.

The particular apron driving structure described, comprising the two axially spaced apart rows of sprocket teeth 96 engaging the sleeve structures 60, is effective to distribute the forces developed between the sprockets 34 and sleeves 60 over a relatively large area. Inasmuch as the driving forces are distributed along each side of the conveyor apron 16 the application of the driving force to each rod 50 through the sleeves at four longitudinally spaced locations therealong substantially minimizes and obviates the tendencies of the rods 50 to bow along the length thereof when driving forces are imparted thereto. Accordingly, the rods 50 may have a smaller cross section than those heretofore employed.

In addition to the advantages obtained from the better distribution of driving forces applied to the conveyor apron 16, as described above, it will be appreciated that there is no moving metal-to-metal contact between any of the parts of the conveyor structure. As stated above, the cylindrical bearing surfaces 76 of the axially extending end portions 68 of the sleeves 60 are received within the slots 58 of the links 54 of the chains 52 and are thus interposed between the links and the metal rods 50. These bearing surfaces 76, particularly when the sleeves are formed of nylon or the like, greatly minimize wear and completely eliminate all wear between the links and the rods 50. Furthermore, inasmuch as the body portions 62 of the sleeves ride upon the support strips 26 provided on the apron supporting frame members 18, it will be seen that there is no direct contact or wear between the metal rods 50 and the supporting frame members 18. In addition, inasmuch as the teeth 96 of the sprockets 34 engage the sleeves rather than the rods 50 themselves, it will be seen that the sprockets also contribute no wear upon the rods 50. In view of all of these facts, the metal rods 50, if desired, may be formed of very light and relatively soft metal such as aluminum, thereby materially reducing the overall weight of the conveyor apron and thereby reducing the energy that is required to move the apron per se. This then, among the other advantages obtained, adds to the efficiency with which the conveyor structure may be operated. Certain other advantages are also obtained. For example, inasmuch as the body portions 62 of the sleeves 60 ride upon the support strips 26 provided on the frame members 18, and inasmuch as the diameter of the bearing surfaces 76 on the sleeves is somewhat less than the width of the slots 58 in the links 54, the rods 50 tend to be turned about their axes as the conveyor apron is advanced. This tendency of the rods 50 to turn causes the entire surfaces of the rods to be employed at one time or another in contact with the loads placed upon the conveyor apron. This in turn avoids any tendency for the rods to become worn on one side by the loads carried thereby and it tends to cause the surfaces of the rods to remain clean and bright.

The assembly of the components making up the conveyor apron 16 may be quickly and easily accomplished. The rods 50, being of uniform diameter throughout their lengths and not subject to wear, may simply be comprised of straight lengths of aluminum or steel wire of appropriate diameter cut to proper length. In contrast to prior rod type conveyors, the ends of the present rods need not be turned down or specially shaped, and they need not be hardened. The avoidance of these steps that were necessary in prior conveyors materially reduces the cost and expense of the present conveyor structure.

The ease with which the present conveyor apron may be assembled also contributes to its reduced expense. Assembly is accomplished simply by pressing the sleeves 60 onto the opposite ends of the rods 50, during which time the end walls 70 of the sleeves come into abutting position with the tips of the rods, thereby automatically and properly orienting the sleeves upon the ends of the rods. The links 54 of the chains 52 may then be slipped onto the reduced end portions 68 of the respective sleeves of adjacent rods, whereupon the collars 64 are snapped into place and the assembly of the conveyor apron is thus complete. The replacement of parts is seldom ever required, but in the event it is desired, for example, to replace a bent rod 50, this can easily and quickly be accomplished by removing the appropriate collars 64, slipping off the appropriate links 54 and inserting a replacement rod 50 previously equipped at its opposite ends with sleeves 60. The conveyor apron may then be reassembled in the manner described above. In the assembled condition of the conveyor apron, the sleeves 60 with their collars 64 perform the multiple function of maintaining the rods 50 and the links of the chains 52 in their proper relationships, providing resilient wear surfaces between the rods and links and between the rods and the apron supporting frame members 18, and providing drive elements engaged by the sprocket wheels for effecting movement of the conveyor apron 16.

In FIG. 4 there is shown a second form of conveyor, generally designated by the numeral 110, made in accordance with the embodying the principles of the present invention. The conveyor 110 is designed to include at least one 90° turn in the plane thereof as it advances along its path and includes a frame 112, a drive mechanism 114, and a conveyor apron 116.

The frame 112 includes the curved side members 118 and 119, the outerside member 118 having a greater radius of curvature than the inner side member 119. Rigidly interconnecting the side members 118–119 are a plurality of cross bars 120 which extend transversely between the side members and may be bolted or otherwise anchored thereto. The inner side member 119 is provided with an inwardly and upwardly directed top edge 122 covered by the same type bearing portion 26 previously described and shown in FIG. 6. The side member 118 is also provided with a bearing portion 26 enclosing the top edge thereof. A curved thrust plate 124 is provided on the curved side member 119 and arranged outwardly of the top edge 122 thereof. The thrust plate 124 extends upwardly above the bearing portion 26, being secured to the top edge 122 by L-shaped clips 126.

The drive mechanism 114 includes a drive shaft 32 and toothed sprocket wheels like those previously described herein, except that the sprockets adjacent the inner radius of the turn are of smaller diameter than those adjacent the outer radius. The conveyor apron 116 includes the rods 50 and the sleeve structures 60 comprised of the body 62 and the collar 64 previously described and interconnected by endless chains, as best seen in FIG. 6.

As previously stated, the construction of the conveyor 110 may include at least one 90° turn in its path of travel as it advances therealong. As the drive mechanism 114 advances the apron 116 along the turn of the conveying path, the end walls 70 of the sleeves 60 on the ends of the rods 50 engage the thrust plate 124 to maintain the curved form of the apron 116. It is to be appreciated that in this form of invention the apron 116 is also slidably supported on the non-metallic body portions 62 of the sleeves by the bearing members 26 disposed therebelow on the frame 112. It will be recognized that the links 54, having the elongated slots 58 therein, permit the rods 50 to move with respect to the links 54, whereupon the rods 50 assume radial orientation when moving through the turn defined along the conveying path.

It will be apparent that in assembling the rods 50, the links 54 and the sleeve 60 in either embodiment of the invention, the body portion 62 of the sleeve 60 will first be forced onto the end portions of the rods 50. As the rod end enters the bore 66 the air displaced by the rod escapes from the bore 66 through the air hole 72 provided in the end wall 70. Thus, the rod ends are embraced and enclosed by the body of the sleeves 60. Next, the links 54 will be positioned on the cylindrical bearing surface 76 of the end element 68. Thereafter, the collars 64 are softened by heat so as to be easily forced over the ring portion 82 of the wall 70 and are received on the recessed sections 80 on the elements 68, thereby providing the second shoulders 90 on the sleeves 60. The rods 50, links 54, and sleeves 60 are thus properly associated and connected and, as brought out above, the body portions 62 and collars 64 of the sleeves 60 are located so that they will engage the respective rows of sprocket teeth 96 when brought into adjacency therewith.

In FIGS. 9, 10, and 11 there is shown still another modified form of conveyor 210 having a drive mechanism and a conveyor apron made in accordance with and embodying the principles of the present invention. In this form of conveyor, there are two pairs of endless chains suitably secured by novel sleeve structures to the ends of the apron rods.

Referring to FIG. 11, the drive mechanism includes a drive shaft 32 having mounted thereon in an axially spaced apart arrangement, a pair of sprocket wheels 218. Each sprocket wheel 218 has a central metal hub 220 whereby the wheel 218 may be fixedly secured to the shaft 32 by a cooperating key 36. A tooth equipped portion 222 formed from a material having a low co-efficient friction, such as nylon, may be secured to the hub 220 in any appropriate manner such as by splines. To prevent the sprocket wheels 218 from being displaced longitudinally along the drive shaft 32, set screws 224 may be provided. A single row of outwardly extending, circumferentially spaced apart teeth 226 are provided on the portion 222 of each sprocket wheel 218.

The conveyor apron of FIGS. 9, 10 and 11, an exemplary portion of which is shown in FIG. 9, comprises a plurality of longitudinally extending rods 250 of cylindrical cross section, each having a substantially uniform diameter throughout the entire length thereof. At the opposite end portions thereof, each of the rods 250 is interconnected to the rod 250 next adjacent thereto by a pair of endless chains 252. That is to say, there are a total of four endless chains 252 in the apron, two chains 252 being disposed in spaced apart pairs on each side of the apron. Each of the chains 252 includes a plurality of interconnecting links 54 of the form and arrangement previously described herein.

To maintain the pairs of chains 252 in their proper relationship in the conveyor 210, sleeves 260 are provided on the opposite ends of each rod 250. More specifically, each of the sleeves 260 includes a tubular central body 262 having an axially extending end element 264 at each end thereof and a discrete collar 266 fixedly mounted on each element 264. The central body 262 is an elongated tubular member having a uniform axial bore 268 therein, the bore 268 being closed at one end thereof by an end wall 270. A centrally disposed aperture 272 is arranged in the wall 270 communicating with the bore 268 thereby permitting the escape of air from the bore 268 as the sleeve 260 is pressed over the end of the rod 250. It is to be appreciated that the bore 268 is of a diameter complementary to that of the rod 250 so as to effect a press fit therebetween thereby insuring that the sleeve 260 will be securely mounted upon the rod 250.

The end elements 264 of each sleeve are integrally joined to the central body 262 thereof at first annular shoulders 274, the end elements 264 being of a smaller diameter than the central body 262. Cylindrical bearing surfaces 276 are disposed on the elements 264 immediately adjacent to the first shoulders 274. The bearing surface 276 is of a width greater than that of each endless chain 252 so as to fully engage and support the links 54 of that chain 252, the diameter of the surface 276 being selected so that bearing surface 276 will cooperate with the slots 58 in the links 54.

A peripheral recess 280 is provided on each end element 264 of each sleeve 260 intermediate the bearing surface 276 and the free end of the element 264. A ring-like abutment 282 is defined by the recess 280 at the free end of the end element 264.

Each collar 266 is similar in form in every respect to the collar 64 previously described and is adapted to be received on the recessed portion 280 of each end element 264 in a tight fit.

When nylon body portions 262 and collars 266 are used, the collars may be softened by steam treatment to facilitate fitting the collars 266 over the abutment 282 and into the recessed portions 280. When the collars 266 have returned to ambient temperature and to their normal resilient condition, they will be fixedly secured to the end elements 264, whereby second annular shoulders 284 are provided by the inner faces of the collars 266. More particularly, the distance between the respective first 274 and second 284 shoulders is such that some clearance will be afforded between the shoulders 274, 284 and the adjacent links 54 so as to minimize friction in the system and avoid binding during movement of the conveyor apron 210.

Referring to FIG. 10, it is to be recognized that the non-metallic sleeves 260 engage and ride upon the non-metallic bearing members 26 at the central body 262 intermediate the first shoulders 274 and the chains 252 adjacent thereto. This arrangement supports the conveyor apron and eliminates metal-to-metal contact between the conveyor apron and the conveyor frame.

A thrust plate 124 may be provided on one or both of the frame members 18 for limiting lateral outward movement of the rods 250. Whether the plate 124 and frame members 18 be straight or curved, the end walls 270 of the sleeves 260 will slidably engage the plate or plates 124 as the apron moves along the conveying path.

In the operation of the conveyor 210, the single row of teeth 226 on each sprocket wheel 218 engages the central body portion 262 of the sleeves 260 intermediate the first shoulders 274 and the pairs of chains 252 adjacent thereto. Thus, the driving forces are applied to the conveyor apron 210 along a line coincident with the line of sliding support. That is to say, the sprocket teeth 226 engage the sleeves 260 in the same area as the sleeves engage the bearing members 26. Therefore, the requirements for reinforcing the apron 210 to withstand both the load of the conveyed articles and the driving forces may be satisfied with a single structural element, the sleeve 260.

In assembling the conveyor apron 210 the inner one of the collars 266 may be slipped onto the rods 250 and the links 54 of the inner one of the chains 252 slipped on thereafter. Next, a sleeve 260 with its central body with the end elements integrally joined thereto, is pressed onto the end portion of each rod 250, the air in each bore 268 being expelled through the apertture 272 in the end wall 270. Thereafter, the links 54 of the outer one of the chains 252 may be mounted on the proper bearing surface 276 adjacent to the first shoulder 274. Heat may be applied to the collars 266, softening them so that they may be received over the ring-like abutments 282 on the free ends of the elements 264 and seated in their respective recesses 280.

Alternatively, the pair of chains 252 may be mounted on the sleeves 260 prior to pressing the rods 250 into the bore 268 of the sleeves 260. In this arrangement, the sleeves 260 and chains 252 may be assembled at the point of manufacture and thereafter shipped to the user for the assembly of the rods 250. The packaging of the sleeves and chains together, the rods being shipped separately, produces an easily transported conveyor apron for quick assembly at the point of use.

It is to be appreciated that the first shoulders 274 on each sleeve 260 prevent laterally converging movements of the spaced apart chains 252 mounted on the sleeve. Similarly, the second shoulders 284 provided by the inner faces of the collars 266 mounted on the end elements 264 arrest laterally diverging movements of the chains 252. The cylindrical bearing surfaces 276 intermediate the first 274 and second 284 shoulders provide smooth seats for the links 54 and produce a strong, low friction linkage between the chains 252 and the sleeves 260.

It will be understood that all of the advantages explained above with respect to the conveyor construction of FIGS. 1 to 3 and 5 to 8, are equally applicable with respect to the constructions shown in FIGS. 4 and 6 and FIGS. 9 to 11.

While there has been described what is at present considered to be the preferred embodiments of the invention, it will be understood that various modifications may be made therein, and it is intended to cover in the appended claims all such modifications as fall within the true spirit and scope of the invention.

We claim:

1. In a conveyor construction including spaced parallel link chains having succeeding links joined together for relative pivotal movement about respective transverse axes, said links having transverse openings therethrough around said pivot axes, and spaced parallel apron rods having opposite ends extending through said openings to thereby mount said rods on said chains for conjoint movement longitudinally of said chains and for relative rotation therebetween about said pivot axes, a plurality of resilient non-metallic sleeves mounted adjacent opposite ends of said rods respectively, said sleeves each including an elongated tubular member and a collar, said tubular members receiving said rod ends fixedly therein in resilient gripping engagement with the rods, said tubular members each including an enlarged section having a greater diameter than said link openings and an integral reduced diameter section extending through one of said link openings and outwardly therebeyond, said collar being removably mounted around the outwardly extending portion of said reduced section fixedly thereon in resilient gripping engagement therewith, and said collar having a greater diameter than said link openings, whereby said enlarged sections and said collars prevent substantial transverse displacement of said chains relative to said sleeves, and said reduced sections provide bearings for said links.

2. A conveyor construction as defined in claim 1 wherein at least one element of said sleeve enlarged section and collar elements is drivably engageable with a conveyor drive sprocket.

3. A conveyor construction as defined in claim 1 including groove means on said outwardly extending portion receiving said collar therein to prevent transverse displacement of the collar relative to the extending portion.

4. In a conveyor construction including spaced parallel link chains having succeeding links jointed together for relative pivotal movement about respective transverse axes, said links having transverse openings therethrough around said pivot axes, and spaced parallel apron rods having opposite ends extending through said openings to thereby mount said rods on said chains for conjoint movement longitudinally of said chains and for relative rotation therebetween about said pivot axes, a plurality of resilient non-metallic sleeves mounted adjacent opposite ends of said rods respectively, said sleeves each including an elongated tubular member and a collar, said tubular members receiving said rod ends fixedly therein in resilient gripping engagement with the rods, said tubular members each including an enlarged section having a greater diameter than said link openings and an integral reduced diameter section extending through one of said link openings and outwardly therebeyond, said collar being removably mounted around the outwardly extending portion of said reduced section fixedly thereon in resilient gripping engagement therewith, said collar having a greater diameter than said link openings, groove means on said outwardly extending portion receiving said collar therein to prevent transverse displacement of the collar relative to the extending portion, and said tubular members each including an integral wall across one end thereof and adapted to abut on the adjacent rod extremity, whereby said enlarged sections and said collars prevent substantial transverse displacement of said chains relative to said sleeves, said reduced sections provide bearings for said links, and said walls serve to locate said sleeves on said rods and provide bearing surfaces on the rod extremities.

5. In a conveyor construction including pairs of adjacent spaced parallel link chains disposed in spaced parallel pairs, said chains having succeeding links joined together for relative pivotal movement about respective transverse axes, said links having transverse openings therethrough around said pivot axes, and spaced parallel apron rods having opposite ends extending through aligned openings in adjacent chains to thereby mount said rods on said chains for conjoint movement longitudinally of said chains and for relative rotation therebetween about said pivot axes, a plurality of resilient non-metallic sleeves mounted adjacent opposite ends of said rods respectively, said sleeves each including an elongated tubular member and a pair of collars, said tubular members receiving said rod ends fixedly therein in resilient gripping engagement with the rods, said tubular members each including an enlarged central section having a greater diameter than said link openings and disposed between adjacent chains, and integral reduced diameter sections extending in opposite directions therefrom through aligned link openings in said adjacent chains and outwardly therebeyond, said collars being removably mounted respectively around the outwardly extending portions of said reduced sections fixedly thereon in resilient gripping engagement therewith, said collars each having a greater diameter than said link openings, and groove means on said outwardly extending portions receiving said collars therein to prevent transverse displacement of the collars relative to the extending portions, whereby said enlarged sections and said collars prevent substantial transverse displacement of said chains relative to said sleeves, and said reduced sections provide bearings for said links.

6. A conveyor construction as defined in claim 5 wherein said tubular members each include an integral wall across one end thereof and adapted to abut on the adjacent rod extremity, whereby said walls serve to locate said sleeves on said rods and provide bearing surfaces on the rod extremities.

References Cited by the Examiner

UNITED STATES PATENTS

| 1,664,763 | 4/28 | Webb | 198—137 X |
| 1,707,088 | 3/29 | Lynch | 198—189 |
| 1,724,150 | 8/29 | Webb | 198—189 |
| 2,138,317 | 11/38 | Weiss | 198—189 X |
| 2,158,622 | 5/39 | Festenberg-Pakisch | 74—255 |
| 2,389,874 | 11/45 | Searles et al. | 74—251 X |
| 2,633,975 | 4/53 | Koerber | 198—182 |
| 2,753,039 | 7/56 | Velten et al. | 198—195 |
| 2,816,453 | 12/57 | Frank et al. | 198—189 X |
| 2,969,870 | 1/61 | Pulver | 198—195 |

FOREIGN PATENTS

| 81,070 | 5/56 | Denmark. |
| 873,496 | 7/61 | Great Britain. |
| 547,145 | 8/56 | Italy. |

SAMUEL F. COLEMAN, *Primary Examiner.*

JULIUS WEST, ERNEST A. FALLER, *Examiners.*